United States Patent [19]

Okada et al.

[11] Patent Number: 4,840,059

[45] Date of Patent: Jun. 20, 1989

[54] METHOD FOR ADJUSTING FUEL INJECTION QUANTITY OF ELECTROMAGNETIC FUEL INJECTOR

[75] Inventors: Tatsuo Okada, Okazaki; Sadao Sumiya, Takahama; Masakimi Nakano, Nishio, all of Japan

[73] Assignee: Nippondenso Co., Ltd., Kariya, Japan

[21] Appl. No.: 222,083

[22] Filed: Jul. 20, 1988

[30] Foreign Application Priority Data

Jul. 21, 1987 [JP] Japan ................................ 62-180062

[51] Int. Cl.[4] ................................ G01M 15/00

[52] U.S. Cl. ................................ 73/119 A

[58] Field of Search ................ 73/119 A, 3, 1 H; 239/71, 74, 533.3

[56] References Cited

U.S. PATENT DOCUMENTS 3,662,987 5/1972 Schlagmuller et al. ............ 251/139
4,502,326 3/1985 Kaczynski ........................ 73/119 A

FOREIGN PATENT DOCUMENTS 1072428 12/1959 Fed. Rep. of Germany .
3424326 2/1986 Fed. Rep. of Germany .
62-17365 1/1987 Japan .
2134981 8/1984 United Kingdom .

*Primary Examiner*—Jerry W. Myracle
*Attorney, Agent, or Firm*—Cushman, Darby & Cushman

[57] ABSTRACT

A method for adjusting the fuel injection quantity of an electromagnetic fuel injector having a needle valve, an electromagnetic actuator composed of a movable core which moves with the needle valve and a fixed iron core for attracting the movable core to move the needle valve to its open position, an adjust pipe inserted within a through hole of the fixed iron core, and a spring interposed between the adjust pipe and the movable core for continuously biasing the needle valve to its closed position, has the steps of inserting the adjust pipe into the through hole of the fixed iron core by a predetermined length and temporarily fixing the adjust pipe to the fixed iron core so as not to be moved by a force received from the spring when the needle valve is operated and so as to start moving when a force larger than the above described force of the spring is applied, running in the injector for a predetermined period of time, finely adjusting the position of the adjust pipe while checking the actual fuel injection quantity, and unmovably fixing the adjust pipe to the fixed iron core at such a position that the injector injects a desired injection quantity of fuel.

5 Claims, 3 Drawing Sheets

METHOD FOR ADJUSTING FUEL INJECTION QUANTITY OF ELECTROMAGNETIC FUEL INJECTOR

BACKGROUND OF THE INVENTION

1. Field of the Invention

The present invention relates to an electro-magnetic fuel injector for supplying fuel to an internal combustion engine, and more particularly to a method for adjusting the injection quantity of fuel in the producing step thereof.

2. Description of the Prior Art

The conventional electromagnetic fuel injector of this type is provided with a needle valve which is reciprocally accommodated within a valve body, and an electromagnetic actuator for moving the needle valve to its open position, as shown in Japanese unexamined patent publication No. Sho 62-17365, for example.

The electromagnetic actuator includes a movable core which moves with the needle valve, and a fixed iron core around which an electromagnetic coil is wound. Into this iron core is inserted an adjust pipe in the moving direction of the needle valve. This adjust pipe serves as a fuel passage. The tip end of the adjust pipe is opposed to the movable core through a spring which continuously pushes and biases the needle valve in the direction of its closed position.

Upon the energization of the fixed iron core of the electromagnetic actuator, the movable core is attracted by the fixed iron core against the biasing force of the spring, and the needle valve moves to its open position so that fuel passes a nozzle hole formed in the valve body and is injected therefrom.

The injection quantity of fuel is varied in accordance with the opening and closing speed of the needle valve, which depends on the attracting force of the electromagnetic actuator and the biasing force of the spring. Therefore, conventionally, the compression quantity of the spring, that is the biasing force thereof is controlled by adjusting the position of the adjust pipe with respect to the movable core thereby to obtain a desired fuel injection quantity.

By caulking an outer peripheral portion of the fixed iron core after the above described adjustment, the adjust pipe is unmovably fixed to the fixed iron core thereby to set the injection quantity of fuel.

However, the above described conventional adjustment has a problem that the biasing force of the spring is apt to be undesirably varied during caulking of the fixed iron core or during running in the obtained electromagnetic fuel injector by electrifying the electromagnetic actuator and reciprocating the needle valve. Namely, the adjust pipe is comparatively freely movable in its axial direction before caulking. But, this adjust pipe is displaced due to the shock of caulking to vary the biasing force of the spring. This displacement of the adjust pipe can be considered to be resulted from that the outer periphery of the fixed iron core is caulked at a time to plastically deform and unequally expand the fixed iron core in an axial direction of the adjust pipe. And during running in, the spring is deformed to its more stable posture to vary the biasing force of the spring. This undesirable variation in the spring biasing force disenables the accurate adjustment of the injection quantity, and accordingly the injection quantity of the injector is frequently scattered from each other.

SUMMARY OF THE INVENTION

It is an obeject of the present invention to provide a method of adjusting the fuel injection quantity of an electromagnetic fuel injector, which enables the accurate adjustment of the fuel injection quantity and reduces the scattering in injection quantity.

The method of adjusting the fuel injection quantity of the present invention includes the steps of inserting an adjust pipe into a through hole of a fixed iron core by a predetermined length, temporarily fixing the adjust pipe to the fixed iron core so as not to be moved by a force received from a spring for continuously biasing a needle valve to its closed position, when the needle valve is operated and so as to start moving when a force larger than the above described force of the spring, is applied, running in the electromagnetic fuel injector with the adjust pipe temporarily fixed to the fixed iron core for a predetermined period of time, finely adjusting the position of the adjust pipe while checking the actual fuel injection quantity, and unmovably fixing the adjust pipe to the through hole of the fixed iron core by caulking the outer peripheral portion of the fixed iron core at such a position that the injector injects a desired injection quantity of fuel.

According to the present invention, even if the biasing force of the spring is varied due to the change in posture thereof or the like during the running-in of the injector, the position of the adjust pipe is finely adjusted again after the running-in of the injector. Therefore, the change in biasing force of the spring can be cancelled before finally fixing the adjust pipe.

Moreover, before the adjust pipe is finally fixed to the fixed iron core by caulking, it is temporarily fixed to the fixed iron core. Therefore, the adjust pipe is prevented from easily moving, and accordingly being displaced due to the shock generated during caulking.

Therefore, after the adjust pipe is finally fixed, the biasing force of the spring is not changed, and the injection quantity of fuel can be adjusted to a desired value with accuracy.

BRIEF EXPLANATION OF THE DRAWINGS

FIG. 1 is a sectional view of one embodiment of an electromagnetic fuel injector to which a method according to the present invention is applied;

FIG. 2 is a flow chart showing the method of this embodiment; and

FIG. 3 is a characteristic graph showing the change in deviation of the actual fuel injection quantity from the desired fuel injection quantity with the passage of time during the running-in of the injector.

DETAILED DESCRIPTION OF THE EMBODIMENT

Figure 1:
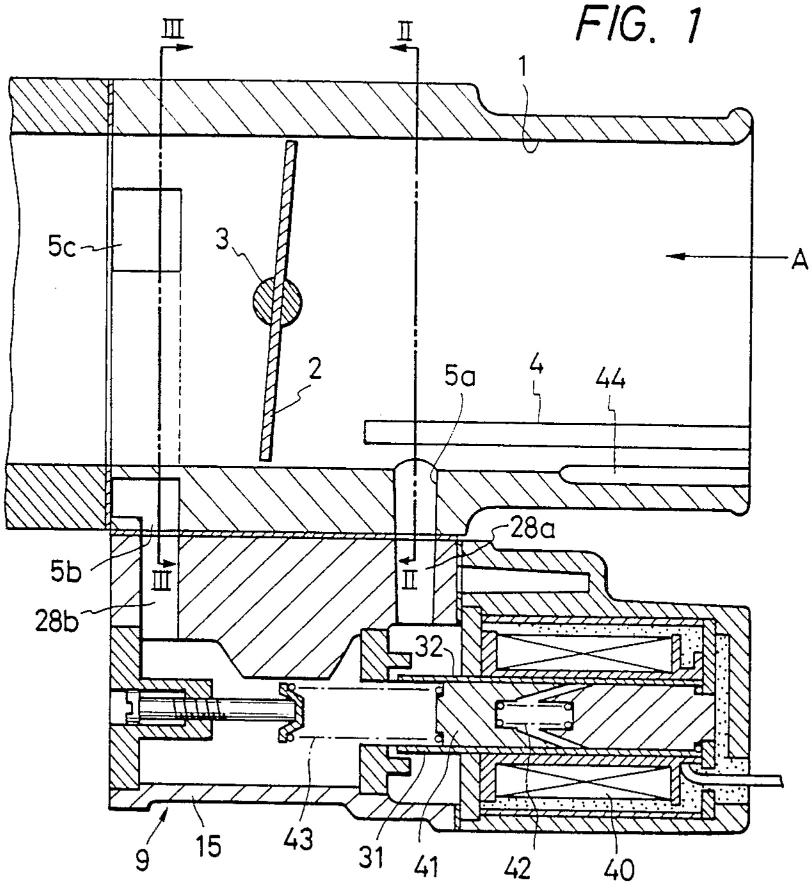
FIGS. 1 through 3 show one embodiment of a method according to the present invention.

Hereinafter, the present invention will be explained in accordance with one embodiment with reference to the drawings.

At first, the structure of the electromagnetic fuel injector will be explained.

A valve body 1 is composed of a nozzle body 2 and a housing 3. And a cover 4 is fit on a tip end portion of the nozzle body 2.

A nozzle hole 5 is formed in the tip end portion of the nozzle body 2 so as to open into an intake manifold (not shown), and a conical valve seat 6 is also formed in the tip end portion so as to continue from the nozzle hole 5. Within a guide hole 7 is accommodated a needle valve 8 so as to be reciprocated in an axial direction. The needle valve 8 is provided with sliding members 9*a* and 9*b* which slidably fit in the inner surface of the guide hole 7 at spaced two positions. A tip end of the needle valve 8 detachably contacts with the valve seat 6.

The base end portion of the needle valve 8 penetrates a stopper plate 11 retained between the nozzle body 2 and the housing 3. And a flange portion 12 is formed around the base end portion of the needle valve 8 so as to come in contact with a lower surface of the stopper plate 11 for limiting the lift quantity of the needle valve 8.

Within the housing 3 is provided an electromagnetic actuator 13 for reciprocating the needle valve 8.

The electromagnetic actuator 13 is provided with a movable core 14 connected to the base end portion of the needle valve 8, a fixed iron core 15 provided so as to be spaced from the movable core 14 in the moving direction of the needle valve 8, and an electromagnetic coil 17 which is wound around a bobbin 16 surrounding the fixed iron core 15.

The fixed iron core 15 projects from the housing 3 and is supported thereby. The fixed iron core 15 is provided with a through hole 18 extending in the moving direction of the needle valve 8. A lower end of the through hole 18 opens in a lower end surface of the iron core 15, which is opposed to the movable core 14 while an upper end of the through hole 18 opens in an upper end surface of the iron core 15. An adjust pipe 19 is inserted into the through hole 18 and is fixed within the fixed iron core 15 by caulking the outer peripheral portion of the iron core 15 at opposed two positions. In the outer peripheral surface of the adjust pipe 19, which is opposed to a caulked portion 20, are formed a plurality of grooves 21 for squeezing the inner wall of the fixed iron core 15, which defines the through hole 18, to the grooves 21 of the adjust pipe by caulking, and preventing the fixed iron core 15 from moving in the axial direction.

A lower end of the adjust pipe 19 is opposed to the movable core 14. And a coil spring 22 is interposed between the adjust pipe 19 and the movable core 14 for continuously biasing the tip end of the needle valve 8 toward the valve seat 6.

By electrifying the electromagnetic coil 17, the fixed iron core 15 is energized and the movable core 14 is attracted by the fixed iron core 15 against the biasing force of the coil spring 22. This results in that the tip end of the needle valve 8 is detached from the valve seat 6 so that the nozzle hole 5 is opened.

By cutting off current to the electromagnetic coil 17, the iron core 15 is dienergized, and the movable core 14 is pushed in a direction away from the fixed iron core 15 by the biasing force of the coil spring 22 so that the tip end of the needle valve 8 is seated on the valve seat 6 to close the nozzle hole 5.

The inner space of the adjust pipe 19 serves as a fuel passage 23. The upstream end of the fuel passage 23 is communicated with a fuel feed pump (not shown) through a fuel filter 24. Fuel from the fuel feed pump passes the fuel filter 24, the fuel passage 23 of the adjust pipe 19, the space around the coil spring 22, the space around the movable core 14, the space between the movable core 14 and the needle valve 8, and the space around the flange portion 12, and then flows into the guide hole 7. The fuel flowing into the guide hole 7 passes the space between the sliding portions 9*a*, 9*b* and the inner surface of the guide hole 7 and flows into the valve seat 6.

The fuel flowing into the valve seat 6 is injected into the intake manifold when the needle valve 8 is lifted and the tip end thereof leaves the valve seat 6.

A connector 25 is provided in the outer periphery of the fixed iron core 15. This connector 25 is provided with a pin 26 which is electrically connected to the electromagnetic coil 17. The pin 26 is electrically connected to an electronic control circuit (not shown) including a microcomputer. This electronic control circuit controls the electrifying time to the electromagnetic coil 17.

Hereinafter, the method for adjusting the injection quantity of fuel of the electromagnetic fuel injector while producing the injector will be explained.

The coil spring 22 is inserted into the through hole 18 of the fixed iron core 15 and is positioned in contact with the upper surface of the movable core 14. Thereafter, the adjust pipe 19 is pushed in the through hole 18 by a predetermined length whereby the coil spring 22 is retained by the adjust pipe 19 and the movable core 14 in the compressed state.

In this state, the injection quantity of fuel is temporarily adjusted by moving the position of the adjust pipe 19 while the electromagnetic coil 17 is electrified. (Step 101) The temporarily adjusted injection quantity is made slightly larger than the desired injection quantity, for it is easier to push the adjust pipe 1 underward in FIG. 1 as compared with the case wherein the adjust pipe 1 is pulled upward, in finally adjusting the position of the adjust pipe which is temporarily caulked as described later.

Next, the outer periphery of the fixed iron core 15 is caulked at radially symmetric positions to temporarily fix the adjust pipe 19 to the fixed iron core 15 (Step 102).

The temporarily fixed adjust pipe 19 is not moved by a force (300 to 900 g ) which will be received from the coil spring 22 during the running-in of the injector, but starts moving in the axial direction when a force larger than the above described force is applied thereto. In the present embodiment, the caulking force for temporarily fixing the adjust pipe 19 is set to about 0.5 ton, which is about one fourth of the finally caulking force. (The fixing force of the adjust pipe 19 to the fixed iron core 15 due to this temporary fixing is about 10 kg.)

This temporary fixing is preferably performed at a position B away from the grooves 21 and approaching the coil spring 22 by several mm from the final caulking position A in view of the presence of the grooves 21.

After temporarily fixing the adjust pipe 19, the electromagnetic actuator 13 is electrified to run in the needle valve 8, the coil spring 22 or other components for stabilizing the biasing force of the coil spring 22 (Step 103).

Figure 3:
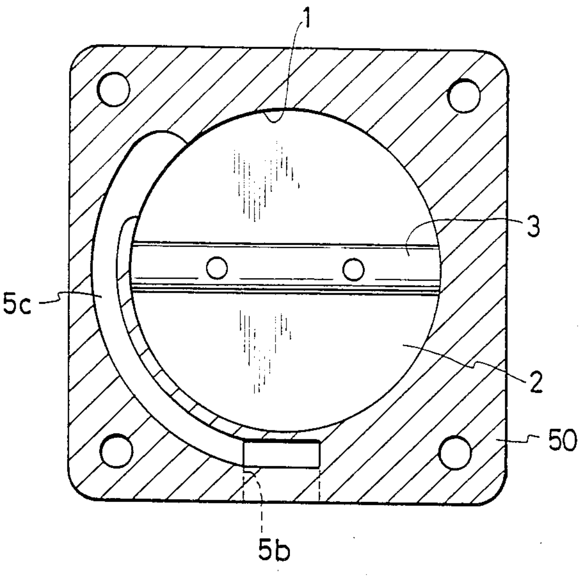
Figure 4:
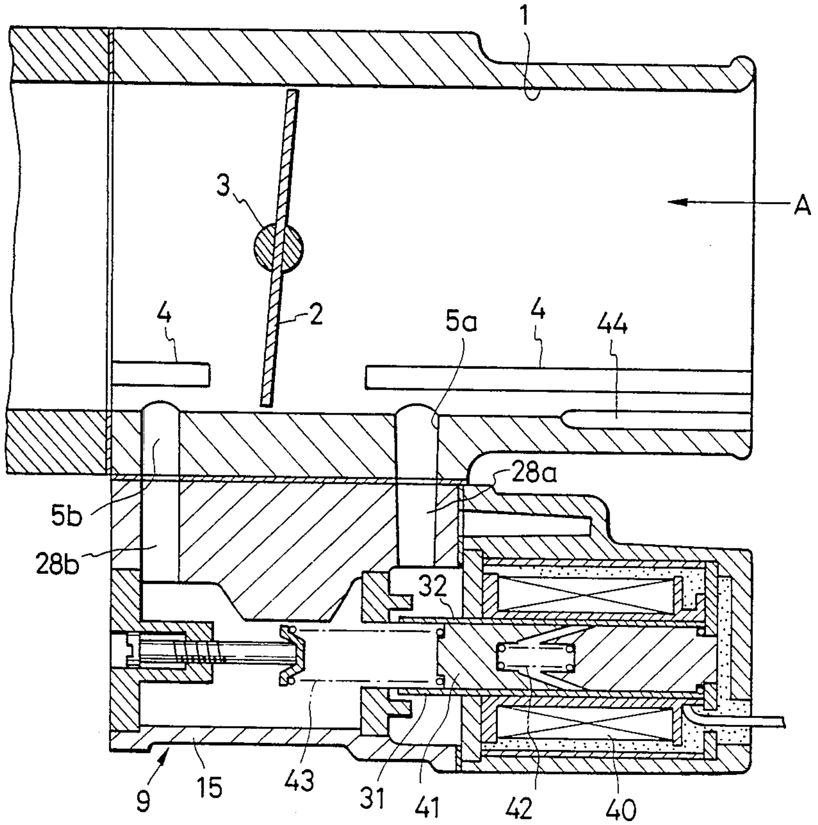
Figure 5:
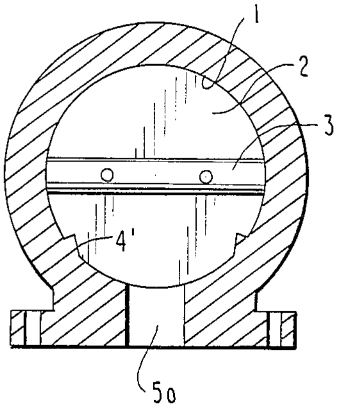
Figure 1:
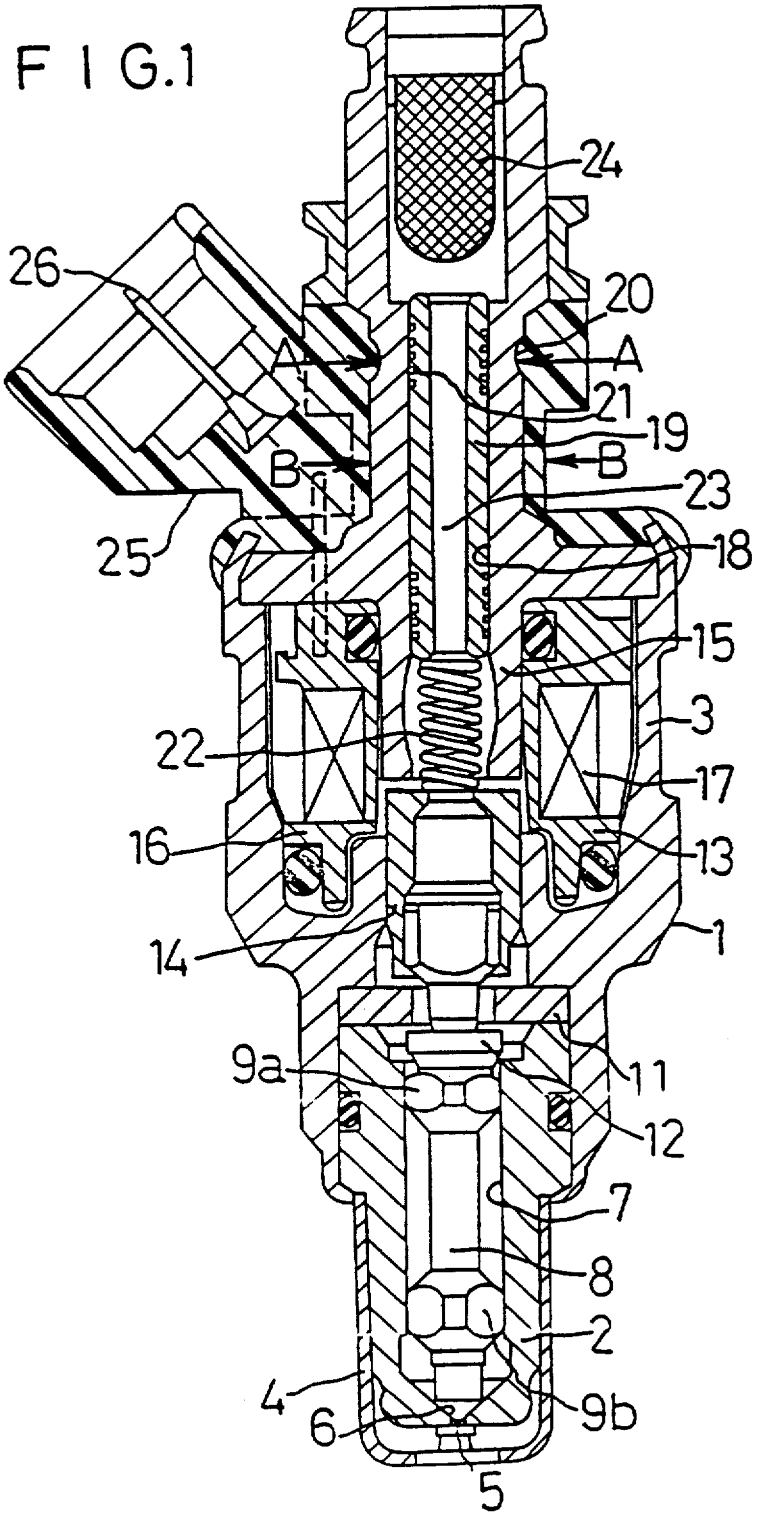
Figure 2:
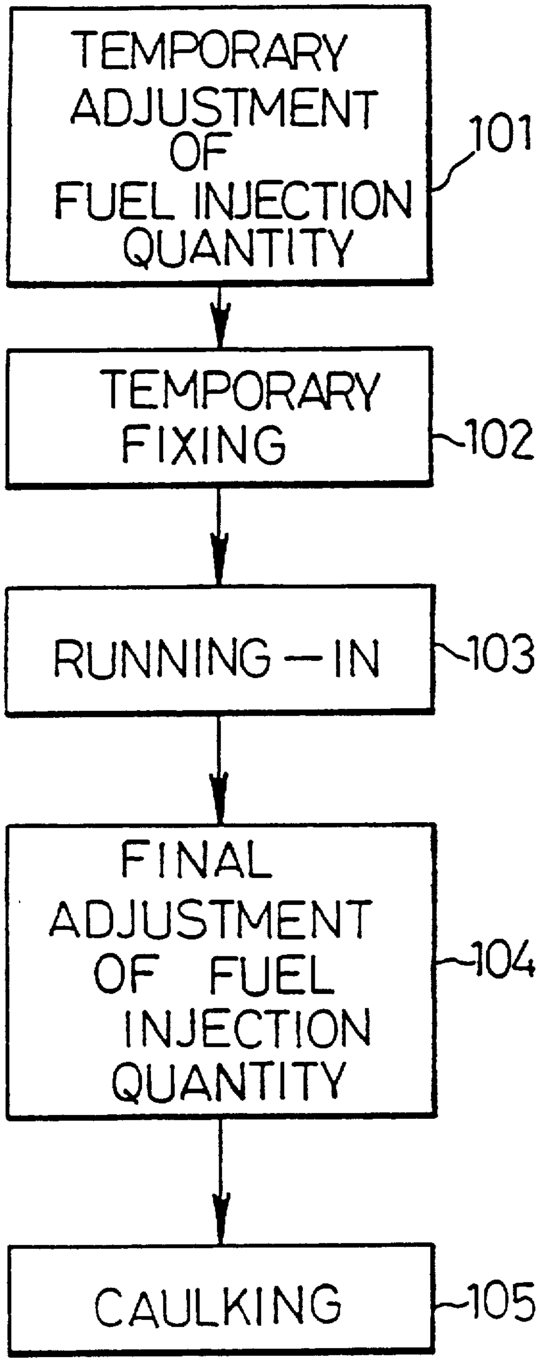
Figure 3:
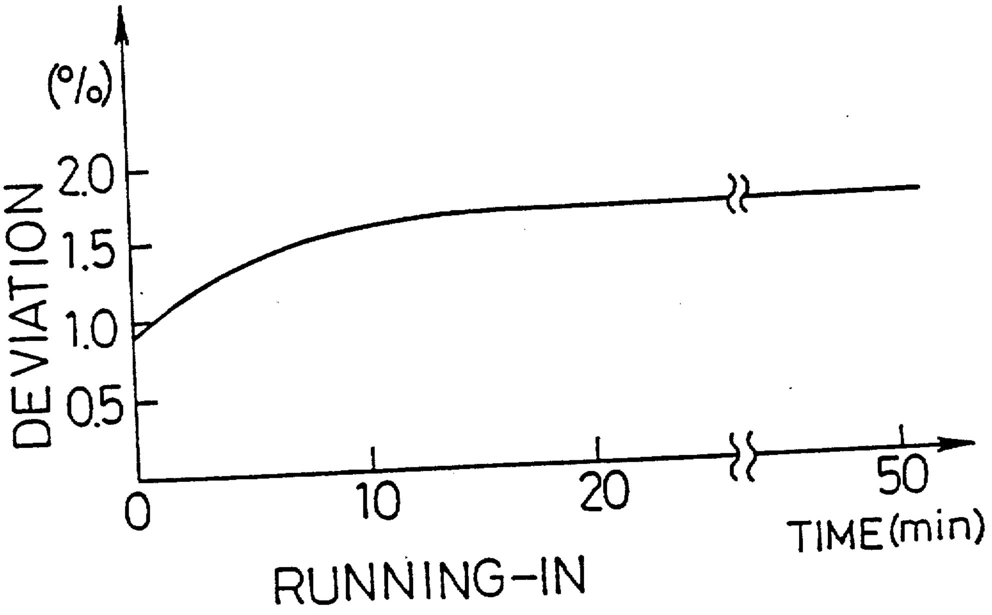

One example of the change in the deviation of the actual injection quantity from the desired fuel injection quantity with the passage of time while the injector is run-in is shown in FIG. 3. As is apparent from the drawing, the deviation becomes constant and stable after ten minutes of running-in.

And after the injector is run in, the adjust pipe 19 is slightly moved by a force of about 15 kg so that the injection quantity reaches a desired value while the actual injection quantity is checked whereby the stable deviation is cancelled and the injection quantity is finally adjusted (Step 104).

Finally, the outer periphery of the fixed iron core 15 is sufficiently caulked (with about 2 ton, for example) at the final caulking position A opposed to the grooves 21 to unmovably fix the adjust pipe 19 with respect to the fixed iron core 15 (Step 105). (The fixing force of the adjust pipe 19 to the fixed iron core 15 due to the final caulking is about 200 kg.)

In this step, the adjust pipe 19 is prevented from being displaced due to the shock of caulking, and the biasing force of the coil spring 22 is prevented from changing since the adjust pipe 19 is temporarily fixed to the fixed iron core 15.

As described above, the injection quantity adjusting method of the present invention includes the step of temporarily fixing the adjust pipe within the fixed iron core, running-in the injector, finely adjusting the position of the adjust pipe for cancelling the change in needle valve biasing force due to the running-in of the injector, and finally fixing the adjust pipe by finally caulking.

This adjusting method can prevent the needle valve biasing force from changing in the initial running of the injector. And this adjusting method can restrain the adjust pipe from being displaced due to caulking force since the adjust pipe is temporarily fixed before the final fixing thereof. This results in that the change in needle valve biasing force can be also prevented during caulking.

Therefore, the injection quantity of the electromagnetic fuel injector can be accurately adjusted to a desired value.

The present inventors have examined the scattering in fuel injection quantity of the case including the above described temporarily fixing step of the adjust pipe 19 and the case including no temporarily fixing step. As a result, 1.7% of scattering in injection quantity is observed in the case including the temporarily fixing step, which is only about one half of the scattering of the case including no temporarily fixing step, that is 3.5%.

It is desirable to temporarily fix at the position approaching the coil spring 22 from the final caulking position. Th experimental results show that in this case, the displacement of a lower end surface of the adjust pipe 19 due to the final caulking is as small as 7.0μ, and the change in injection quantity is small. (The permissible change in injection quantity is not more than about 2μ of the displacement of the lower end surface of the adjust pipe 19.) This can be considered to be resulted from that the plastical deformation of the fixed iron core 15 due to the final caulking, uniformly expands in an axial direction of the adjust pipe 19 upward in FIG. 1.

In contrast, when the final caulking is performed at the position approaching the coil spring 22 from the temporarily fixing position, the above described displacement of the adjust pipe 19 is as large as 20μ, but is nearly constant. In this case, if the position of the adjust pipe 19 is adjusted after due consideration of the above displacement, unscattered injection quantity can be obtained.

Moreover, the present inventors have examined the change in injection quantity of the case where the temporary fixing is performed at the same position as that of the final fixing position. The test result shows that the scattering in injection quantity is 2.3%, which is about two third of the case including no temporarily fixing step.

Therefore, even when the temporarily fixing position is equal to the final fixing position, the resulting scattering in injection quantity can be greatly decreased as compared with the case including no temporarily fixing step. Therefore, by temporarily fixing the adjust pipe at the final fixing position, the object of the present invention can be also achieved.

The temporarily fixing method of the adjust pipe is not limited to caulking. The adjust pipe may be temporarily fixed by press fitting the adjust pipe into the through hole provided the position of the adjust pipe can be adjusted again after being temporarily fixed, and the adjust pipe can be unmovably fixed in the temporarily fixed state during running-in the injector.

As described above, according to the present invention, the fuel injection quantity can be accurately adjusted to a desired value, and the scattering in injection quantity can be surely prevented.

What is claimed is:

1. A method for adjusting the fuel injection quantity of an electromagnetic fuel injector composed of a needle valve reciprocally accommodated in a valve body for opening and closing a nozzle hole, and an electromagnetic actuator for reciprocally moving said needle valve, said electromagnetic actuator having a movable core which moves with said needle valve, and a fixed iron core for attracting said movable core to move said needle valve to its open position, an adjust pipe being provided within a through hole formed in said fixed iron core, and a spring being interposed between a tip end portion of said adjust pipe and said movable core for continuously biasing said needle valve to its closed position, comprising the steps of:

inserting said adjust pipe into said through hole of said fixed iron core by a predetermined length and temporarily fixing said adjust pipe to said fixed iron core so as not to be moved by a force received from said spring when said needle valve is operated and so as to start moving when a force larger than said force of said spring is applied;

reciprocating said needle valve with said adjust pipe temporarily fixed to said fixed iron core for a predetermined period of time for running in said electromagnetic fuel injector;

finely adjusting the position of said adjust pipe while checking actual fuel injection quantity; and unmovably fixing said adjust pipe to said through hole of said fixed iron core by caulking an outer peripheral portion of said fixed iron core at such a position that said injector injects a desired fuel injection quantity.

2. A method for adjusting the fuel injection quantity according to claim 1, wherein said temporarily fixing step is performed by caulking said outer peripheral portion of said fixed iron core with a force one fourth of a caulking force applied in said unmovably fixing step.

3. A method for adjusting the fuel injection quantity according to claim 2, wherein said temporarily fixing step is performed at a position of said outer peripheral portion of said fixed iron core, which is different from a caulking position of said unmovably fixing step.

4. A method for adjusting the fuel injection quantity according to claim 2, wherein said temporarily fixing step is performed at a position of said outer peripheral portion of said fixed iron core, which is the same as a caulking position of said unmovably fixing step.

5. A method for adjusting the fuel injection quantity according to claim 1, wherein said temporarily fixing step is performed by press fitting said adjust pipe in said through hole.

* * * * *

UNITED STATES PATENT AND TRADEMARK OFFICE
CERTIFICATE OF CORRECTION

PATENT NO. : 4,840,059

DATED : June 20, 1989

INVENTOR(S) : Tatsuo OKADA, Sadao SUMIYA, and Masakimi NAKANO

It is certified that error appears in the above-identified patent and that said Letters Patent is hereby corrected as shown below:

The title page showing the illustrative figure should be deleted to appear as per attached title page.

Figure 2:
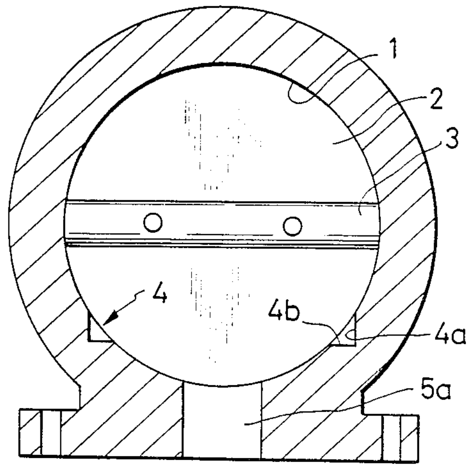

Delete the unrelated drawings Sheets 1, 2 and 3 and substitute correct drawings Sheets 1, 2 and 3, consisting of Figures 1, 2 and 3 as shown on the attached pages.

Signed and Sealed this

Twenty-ninth Day of May, 1990

*Attest:*

HARRY F. MANBECK, JR.

*Attesting Officer*

*Commissioner of Patents and Trademarks*

United States Patent [19]

Okada et al.

[11] Patent Number: 4,840,059

[45] Date of Patent: Jun. 20, 1989

[54] METHOD FOR ADJUSTING FUEL INJECTION QUANTITY OF ELECTROMAGNETIC FUEL INJECTOR

[75] Inventors: Tatsuo Okada, Okazaki; Sadao Sumiya, Takahama; Masakimi Nakano, Nishio, all of Japan

[73] Assignee: Nippondenso Co., Ltd., Kariya, Japan

[21] Appl. No.: 222,083

[22] Filed: Jul. 20, 1988

[30] Foreign Application Priority Data

Jul. 21, 1987 [JP] Japan ................................ 62-180062

[51] Int. Cl.[4] ................................ G01M 15/00

[52] U.S. Cl. ................................ 73/119 A

[58] Field of Search ................ 73/119 A, 3, 1 H; 239/71, 74, 533.3

[56] References Cited

U.S. PATENT DOCUMENTS 3,662,987 5/1972 Schlagmuller et al. ............ 251/139

4,502,326 3/1985 Kaczynski ........................ 73/119 A

FOREIGN PATENT DOCUMENTS 1072428 12/1959 Fed. Rep. of Germany .

3424326 2/1986 Fed. Rep. of Germany .

62-17365 1/1987 Japan .

2134981 8/1984 United Kingdom .

*Primary Examiner*—Jerry W. Myracle

*Attorney, Agent, or Firm*—Cushman, Darby & Cushman

[57] ABSTRACT

A method for adjusting the fuel injection quantity of an electromagnetic fuel injector having a needle valve, an electromagnetic actuator composed of a movable core which moves with the needle valve and a fixed iron core for attracting the movable core to move the needle valve to its open position, an adjust pipe inserted within a through hole of the fixed iron core, and a spring interposed between the adjust pipe and the movable core for continuously biasing the needle valve to its closed position, has the steps of inserting the adjust pipe into the through hole of the fixed iron core by a predetermined length and temporarily fixing the adjust pipe to the fixed iron core so as not to be moved by a force received from the spring when the needle valve is operated and so as to start moving when a force larger than the above described force of the spring is applied, running in the injector for a predetermined period of time, finely adjusting the position of the adjust pipe while checking the actual fuel injection quantity, and unmovably fixing the adjust pipe to the fixed iron core at such a position that the injector injects a desired injection quantity of fuel.

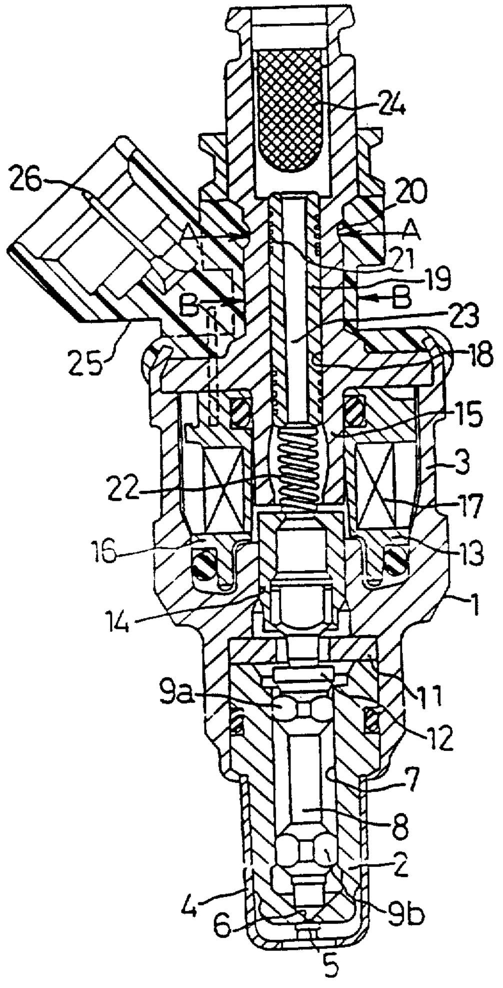

5 Claims, 3 Drawing Sheets